US012655023B2

(12) United States Patent
Koerver et al.

(10) Patent No.: US 12,655,023 B2
(45) Date of Patent: Jun. 16, 2026

(54) METHOD FOR RECYCLING A SOLID ELECTROLYTE AND CATHODE MATERIAL FROM SOLID-STATE LITHIUM BATTERIES

(71) Applicant: Bayerische Motoren Werke Aktiengesellschaft, Munich (DE)

(72) Inventors: Raimund Koerver, Munich (DE); Tobias Teufl, Moos (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 453 days.

(21) Appl. No.: 18/560,147

(22) PCT Filed: May 4, 2022

(86) PCT No.: PCT/EP2022/061991
§ 371 (c)(1),
(2) Date: Nov. 10, 2023

(87) PCT Pub. No.: WO2022/238201
PCT Pub. Date: Nov. 17, 2022

(65) Prior Publication Data
US 2024/0367977 A1     Nov. 7, 2024

(30) Foreign Application Priority Data

May 11, 2021    (DE) ..................... 10 2021 112 298.8

(51) Int. Cl.
    *C01B 25/14*       (2006.01)
    *C01B 35/14*       (2006.01)
            (Continued)

(52) U.S. Cl.
    CPC .............. *C01B 25/14* (2013.01); *C01B 35/14* (2013.01); *C22B 7/001* (2013.01); *C22B 7/006* (2013.01);
            (Continued)

(58) Field of Classification Search
    CPC ......... C01B 25/14; C01B 35/14; C22B 7/001; C22B 7/006; C22B 26/12; C22B 7/005;
            (Continued)

(56) References Cited

U.S. PATENT DOCUMENTS

2019/0273290 A1    9/2019   Sloop
2021/0376399 A1*   12/2021   Morin ..................... C22B 1/005
            (Continued)

FOREIGN PATENT DOCUMENTS

CN      110661051 A   *   1/2020     ............ H01M 10/54
JP       6-338352 A     12/1994
            (Continued)

OTHER PUBLICATIONS

CN 110661051 A: Espacenet English machine translation (Year: 2020).*

(Continued)

*Primary Examiner* — Adil A. Siddiqui
(74) *Attorney, Agent, or Firm* — Crowell & Moring LLP

(57) ABSTRACT

A method for recycling a cathode material and a solid electrolyte from a solid-state lithium battery is provided. The method has the following steps: a) separating the solid-state lithium battery into a solid mixture, said mixture comprising lithium anode, cathode material, and solid electrolyte components, b) mixing the solid mixture with an aprotic solvent, forming a solution of the solid electrolyte in the aprotic solvent and insoluble constituents comprising lithium anode and cathode material, c) separating the solution of the solid electrolyte from the insoluble constituents, d) bringing the insoluble constituents into contact with a protic solvent, forming a solution of lithium salt of the general formula LiX in the protic solvent and undissolved cathode material, e) separating the solution of lithium salt LiX from the undis- (Continued)

solved cathode material, and f) calcinating the separated cathode material while adding a lithium compound.

16 Claims, 1 Drawing Sheet

(51) Int. Cl.
    *C22B 7/00*         (2006.01)
    *C22B 26/12*      (2006.01)
    *H01M 10/54*     (2006.01)

(52) U.S. Cl.
    CPC ............. *C22B 26/12* (2013.01); *H01M 10/54* (2013.01); *C01P 2006/40* (2013.01)

(58) Field of Classification Search
    CPC ....... C22B 7/008; H01M 10/54; H01M 4/131; H01M 2004/028; H01M 2300/0068; H01M 10/052; H01M 10/0562; C01P 2006/40; Y02W 30/84; Y02W 30/20; Y02P 10/20
    See application file for complete search history.

(56) References Cited

U.S. PATENT DOCUMENTS

2024/0055680 A1 * 2/2024 Diaz Aldana ............. C25B 1/14
2024/0204279 A1 * 6/2024 Wang ...................... C22B 7/005

FOREIGN PATENT DOCUMENTS

| JP | 2016-58280 A | 4/2016 | |
| WO | WO 2018/183365 A1 | 10/2018 | |
| WO | WO 2019/051305 A1 | 3/2019 | |
| WO | WO 2020/153973 A1 | 7/2020 | |
| WO | WO-2021119295 A1 * | 6/2021 | ............. C01B 25/14 |

OTHER PUBLICATIONS

English translation of the Written Opinion of the International Search Authority (Year: 2022).*

International Search Report (PCT/ISA/210) issued in PCT Application No. PCT/EP2022/061991 dated Oct. 17, 2022 with English translation (5 pages).

German-language Written Opinion (PCT/ISA/137) issued in PCT Application No. PCT/EP2022/061991 dated Oct. 17, 2022 with English translation (11 pages).

German Search Report issued in German Application No. 10 2021 112 298.8 dated Mar. 17, 2022 with partial English translation (13 pages).

Tan, D. et al., "Sustainable design of fully recyclable all solid-state batteries", MRS Energy & Sustainability: A Review Journal, Jul. 17, 2020, pp. 1-10, XP055967957 (10 pages).

Azhari, L. et al., "Recycling for All Solid-State Lithium-Ion Batteries", Matter, US, Dec. 2, 2020, pp. 1845-1861, vol. 3, No. 6, XP055968126 (17 pages).

Chinese-language Office Action issued in Chinese Application No. 202280031009.1 dated Jul. 18, 2025, with English translation (16 pages).

* cited by examiner

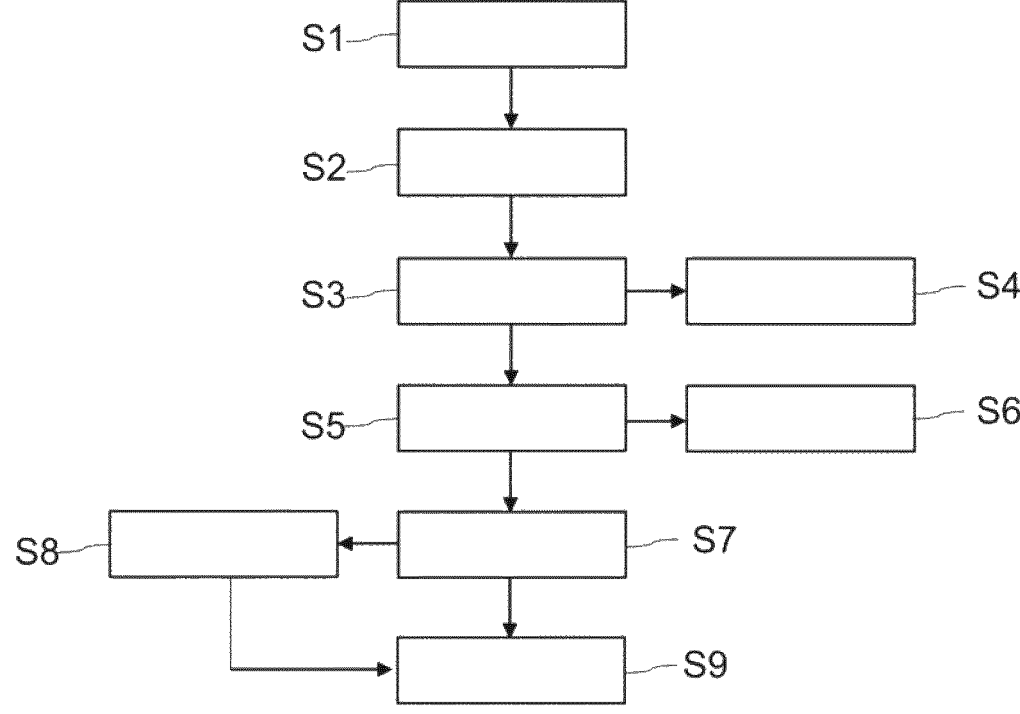

METHOD FOR RECYCLING A SOLID ELECTROLYTE AND CATHODE MATERIAL FROM SOLID-STATE LITHIUM BATTERIES

BACKGROUND AND SUMMARY

The invention relates to a method for recycling a cathode material and a solid electrolyte from solid-state lithium batteries.

The term "solid-state lithium battery" is used synonymously hereinafter for all terms in common use in the prior art for lithium-containing galvanic elements and cells that use at least one solid electrolyte as lithium ion-conducting connection between cathode and anode, for example solid-state lithium-metal battery, solid-state lithium-metal accumulator, all-solid-state battery (ASSB), lithium cell, solid-state lithium ion cell, lithium-polymer cell and lithium ion accumulator. In particular, rechargeable batteries (secondary batteries) are included. The terms "battery", "cell" and "electrochemical cell" are also used synonymously with the term "solid-state lithium battery". Moreover, the term "solid-state lithium battery" also encompasses used batteries and used accumulators.

A solid-state lithium battery has at least two different electrodes: a positive electrode (cathode) and a negative electrode (anode). In a solid-state lithium battery, the anode contains metallic lithium or a lithium-containing alloy. The cathode includes at least one cathode material, optionally together with additions such as electrode binders and electrical conductivity additives.

The cathode material must be capable of reversibly absorbing and releasing lithium ions.

The two electrodes are connected to one another via a solid-state electrolyte that assures ion transport, especially of lithium ions, in the charging and discharging operation. Solid electrolytes are thus capable of conducting electrical current in the solid state via ion transport. The solid electrolytes can be divided into sulfidic, oxidic and polymer-based solid electrolytes. While oxidic and polymer-based solid electrolytes are already in industrial use and are used, for example, as solid electrolytes in sodium-sulfur accumulators, fuel cells or capacitors, sulfide-based solid electrolytes are still at the development stage. However, great potential is ascribed to sulfide-based solid electrolytes with regard to the development and industrialization of battery systems, especially of solid-state lithium batteries.

By contrast with conventional lithium ion batteries containing a liquid electrolyte for the transport of the lithium ions, solid-state lithium batteries thus consist essentially of solid constituents. Solid-state lithium batteries therefore have some advantages by comparison with lithium ion batteries having liquid electrolytes.

In particular, solid-state lithium batteries can achieve higher energy densities compared to conventional lithium ion batteries. These are therefore considered to be promising candidates for use in at least partly electrically driven vehicles. The replacement of the liquid electrolyte, which also includes partly fluorinated compounds in conventional batteries, by a solid electrolyte can additionally stabilize the charging and discharging operations of batteries.

A prerequisite for the success of electromobility is the long-term availability of the materials used in the batteries through an efficient recycling process. In principle, cell concepts based on solid-state lithium batteries will also open up new routes for the development of recycling methods by comparison with the recovery of raw materials from spent lithium ion batteries with a liquid electrolyte.

Most of the recycling methods known from the prior art for conventional lithium ion batteries process the cathode material only, especially the frequently used lithium nickel cobalt oxide (NMC). Recycling is effected by hydrothermal processes. The valuable metals such as nickel and cobalt are dissolved and concentrated by digestion with acids, for example hydrochloric acid or sulfuric acid. For safety reasons, hydrothermal processes must proceed under controlled conditions and are also not environmentally friendly and resource-conserving. One alternative is the pyrometallurgical recycling of lithium ion batteries, wherein the batteries are melted thermally. The pyrometallurgical process results in slag and a molten alloy as products. The slag can be subjected to further hydrometallurgical processing in order to chemically dissolve and concentrate the valuable metals in the slag. The molten alloy contains a mixture of metals of value and can be sent to further processing steps in order to isolate the elements and to recover them as single metals.

However, the two processes described give only the starting elements as pure metals, for example nickel, cobalt, copper, chromium or aluminum. For new battery production, it is thus necessary to synthesize the individual battery constituents again, such as cathode material, electrolyte and anode material. This means a further resource- and energy-intensive step before a battery can be obtained from recycled constituents. Moreover, some constituents, especially the newly synthesized cathode material, still have to be chemically relithiated in order to be usable again in battery systems. The relithiation can be effected with lithium carbonate, for example. It is possible to apply the processes described to a method of recycling solid-state lithium batteries. However, this does not exhaust the full potential of the novel cell concept of solid-state batteries.

The article by Tan et al. (*MRS Energy & Sustainability: A Review Journal,* 2020) discloses a recycling process for sulfide-based solid-state lithium batteries having metallic lithium as anode, $Li_6PS_5Cl$ as solid electrolyte and $LiCoO_2$ as cathode material. The process described comprises five steps for separate recycling of the battery components. However, the recycling process requires complete consumption of the metallic lithium anode. Consequently, only the $Li_6PS_5Cl$ and $LiCoO_2$ components are recycled. In a first step, the cell stack is dismantled in order to make the interior of the battery accessible to further process steps. There follows a workup with a protic solvent, for example ethanol, to form a solution of the solid electrolyte and insoluble constituents including the cathode material. The cathode material is separated from the solution of the solid electrolyte in the third step by filtration or centrifugation. Both the solid electrolyte and the cathode material are obtained separately in the fourth step by drying. The last step of the recycling comprises the regeneration of the solid electrolyte and the cathode material. Heat treatment of the solid electrolyte leads to a recreated solid electrolyte which is usable again in solid-state lithium batteries. Chemical relithiation provides the cathode material for reuse in solid-state lithium batteries.

The process described requires complete consumption of the metallic lithium. For this purpose, for example, the battery has to be completely discharged. Depending on the selection of anode material and the amount of lithium available, however, the uptake capacity of the active cathode material for lithium is limited, and so it is not possible to achieve complete consumption of the metallic lithium present in the cell for every type of cell. For that reason, in the everyday recycling process, the batteries are sent to the recycling cycle with different discharge states. Batteries with different discharge states are therefore unsuitable for recycling by the method described. The residual amounts of metallic lithium remaining in the batteries can react with the protic solvent in the first step of the process, which leads to an extremely reactive mixture that is difficult to separate. The known process is therefore unsuitable for the recycling of solid-state lithium batteries with unconsumed amounts of metallic lithium.

It is an object of the invention to provide a recycling process for the separate recycling of solid electrolyte and cathode material from solid-state lithium batteries in the presence of a metallic lithium anode.

The object is achieved in accordance with the invention by a method of recycling a cathode material and solid electrolyte from solid-state lithium batteries according to the independent claim(s).

According to the invention, the method of recycling a cathode material and solid electrolyte from a solid-state lithium battery includes the following steps: a) separating the solid-state lithium battery into a solid mixture, where the mixture comprises the lithium anode, cathode material and solid electrolyte components, b) admixing the solid mixture with an aprotic solvent to form a solution of the solid electrolyte in the aprotic solvent and insoluble constituents including lithium anode and cathode material, c) separating the solution of the solid electrolyte from the insoluble constituents, d) contacting the insoluble constituents with a protic solvent to form a solution of lithium salts of the general formula LiX in the protic solvent and undissolved cathode material, in which X is an alkoxide or a hydroxide ion, where the lithium anode is reacted with the protic solvent to form hydrogen and lithium salts LiX, and the lithium salts LiX is dissolved in the protic solvent, e) separating the solution of lithium salts LiX from the undissolved cathode material, and f) calcining the separated cathode material with the addition of a lithium compound.

In order to perform the method of the invention, the constituents of the solid-state lithium battery are each admixed step-by-step with an aprotic solvent and a protic solvent. In particular, it is possible in this way to dispense with the use of a costly hydrothermal process for the digestion of the cell stack, as described in the prior art. The use of an aprotic solvent for the digestion of the cell stack permits the formation of a controllable heterogeneous mixture comprising the solution of the solid electrolyte in the aprotic solvent and insoluble constituents including lithium anode and cathode material. By comparison with the protic digestion from the prior art, the mixture is easier to process.

The lithium present in the cell can likewise be used in the recycling process. Controlled addition of the protic solvent in step d) converts the lithium in a controlled manner to soluble and easily handled lithium salts of the LiX form without obtaining a sparingly soluble and reactive mixture. The solution of lithium salts LiX thus obtained can be used directly to relithiate cathode material removed for reuse in battery systems. In addition, it is possible to convert the lithium salts firstly to a solid form and to store them intermediately, or to use the lithium salts in solid or concentrated form, wholly or partly, in calcination step f). Finally, the lithium salts LiX can also be converted to another lithium compound such as lithium carbonate that can be more easily stored. The lithium salts LiX obtained in step d) are thus available directly or indirectly for new production of lithiated cathode material, or can be used as lithium source in other processes. The method of the invention can thus be conducted not merely in the presence of lithium metal in the used battery/spent lithium battery;

instead, the lithium metal present therein is actually utilized for further processing of the cathode material. Thus, the recycling process described is particularly resource-conserving since no external lithium raw materials are required for the relithiation of the cathode material. The configuration of the recycling process enables particularly efficient utilization of the constituents of the solid-state lithium battery. Batteries can be recycled irrespective of their discharge state, which obviates the need for further process steps such as the pretreatment and testing of the cells.

Advantageous embodiments of the method of the invention for recycling a cathode material and solid electrolyte from solid-state lithium batteries are specified in the dependent claims, which can electively be combined with one another.

The invention is described in detail and by way of example hereinafter by preferred embodiments, but these should not be understood in a limiting sense.

The term "recycling" here and hereinafter means the reprocessing of waste materials or spent materials in a production process for their original use or other purposes, but with exclusion of utilization of energy purposes.

Suitable cathode materials for the recycling method may be or consist of any of the positive cathode materials known in the art.

Preferred cathode materials for the recycling method of the invention include, for example, lithium cobalt oxide (LCO), lithium nickel oxide (LNO), lithium nickel cobalt aluminum oxide (NCA), lithium nickel manganese cobalt oxide (NMC), lithium manganese oxide (LMO), lithium iron phosphate (LFP), lithium nickel manganese oxide (LMR), lithium nickel manganese oxide spinel (LNMO) and combinations thereof.

Lithium-nickel-manganese-cobalt compounds are also known by the abbreviation NMC, and in isolated cases also alternatively by the technical abbreviation NCM. NMC-based cathode materials are especially used in lithium ion batteries for vehicles. NMC as cathode material has an advantageous combination of desirable properties, for example high specific capacity, reduced cobalt content, high high-current capacity and high intrinsic safety, which is manifested, for example, in sufficient stability in the event of overcharging.

NMCs may be described by the general formula unit $Li_aNi_xMn_yCo_zO_2$ with x+y+z=1, where a denotes the figure for the stoichiometric proportion of lithium and is typically between 0.8 and 1.15. Particular stoichiometries are referred to in the literature as triplets, for example NMC 811, NMC 622, NMC 532 and NMC 111. The triplet in each case indicates the relative nickel: manganese: cobalt content. In other words, for example, NMC 811 is a cathode material with the general formula unit $LiNi_{0.8}Mn_{0.1}Co_{0.1}O_2$, i.e., with $\alpha$=1. In addition, it is also possible to use the so-called lithium- and manganese-rich NMCs with the general formula unit $Li_{1+\epsilon}(Ni_xMn_yCo_z)_{1-\epsilon}O_2$ where $\epsilon$ is especially between 0.1 and 0.6, preferably between 0.2 and 0.4. These lithium-rich layered oxides are also known as overlithiated (layered) oxides (OLOs).

The method of the invention is especially suitable for recycling of a sulfide-based solid electrolyte. In general, all solid electrolytes based on sulfides that are known in the art are suitable.

The method of the invention is preferentially suitable for recycling of a sulfide-based solid electrolyte comprising a compound having the general formula $Li_{1-a-b-c-d}P_aT_bA_cS_d$ in which T denotes phosphorus, arsenic, silicon, germanium, aluminum or boron, A denotes halogen or nitrogen, and S denotes sulfur, and where $0 \leq a \leq 0.129$, $0 \leq b \leq 0.096$, $0.316 \leq c \leq 0.484$, $0.012 \leq d \leq 0.125$. Such compounds are described in WO 2018/183365 A1.

Equally suitable for the method are sulfide-based solid electrolytes, for example lithium phosphorus sulfides and lithium boron sulfides of the general formula $Li_xT_yS_zR_q$ in which T denotes a boron or phosphorus and R denotes a halogen, and where $2 \leq x \leq 7$, $1 \leq y \leq 7$, $3 \leq z \leq 13$, $0 \leq q \leq 1$.

Lithium phosphorus sulfides are understood to mean compounds having $PS_4^{3-}$ tetrahedra as the structural unit.

Particularly suitable lithium phosphorus sulfides are those of the general formula $Li_xP_yS_zR_q$ in which R denotes a halogen, and where $3 \leq x \leq 7$, $1 \leq y \leq 3$, $4 \leq z \leq 11$, $0 \leq q \leq 1$. Such lithium phosphorus sulfides are described in WO 2020/153973 A1.

Examples of lithium phosphorus sulfides are: $Li_3PS_4$, $Li_7P_3S_{11}$, $Li_6PS_5Cl$, $Li_7PS_6$, $Li_6PS_5Cl_{0.5}Br_{0.5}$, $Li_6PS_5I$, $Li_6PS_5Br$.

Likewise, suitable as sulfidic solid electrolyte for the method of the invention is lithium phosphorus sulfide $L_{10}GeP_2S_{12}$ (LGPS).

In addition, the method of the invention can be used to recycle lithium boron sulfides of the general formula $Li_xB_yS_z$ where $2 \leq x \leq 5$, $1 \leq y \leq 7$, and $3 \leq z \leq 13$. Such lithium boron sulfides are described in WO 2019/051305 A1.

Examples of lithium boron sulfides include the compounds $Li_5B_7S_{13}$, $Li_2B_2S_5$ and $Li_3BS_3$.

In the aforementioned sulfide-based solid electrolytes, sulfur may be replaced wholly or partly by selenium.

The lithium anode for the method of the invention may be or comprise a lithium metal or a lithium alloy, where the lithium alloy preferably comprises the components manganese, zinc, silver, lithium, silicon, germanium, antimony and combinations thereof.

The lithium anode may also be a composite electrode, for example a metallic output conductor provided with a thin lithium layer. The output conductor and optionally further coating constituents of the electrodes may be removed mechanically on separation of the solid-state lithium battery.

In one embodiment, the separation of the solid-state lithium battery may be conducted in a closed system, preferably under a protective gas atmosphere. The separation of the solid-state lithium battery may comprise prior decanning of the cells, for example the removal of the can or pouch. This may be followed by comminution of the electrochemical cell to form a solid blend. The solid blend comprises the lithium anode, solid electrolyte and cathode material constituents. The comminution of the decanned cells is preferably conducted mechanically. The solid blend has a particle size of preferably 1 to 5 mm.

Examples of possible protective gases include argon, nitrogen or sulfur hexafluoride. The separation of the solid-state lithium battery in a closed system under protective gas atmosphere enables the exclusion of atmospheric oxygen and humidity, which can react in an unwanted manner with the metallic lithium anode. This can avoid reaction of the lithium anode before the actual recycling and lack of availability thereof for the relithiation of the cathode material. In particular, when the aprotic solvent is added in the presence of atmospheric oxygen and humidity, sparingly soluble precipitates can be formed, and separation of the individual battery components into individual types is then possible only under more difficult conditions. At the same time, the separation of the cells is conducted in a controlled environment, which enables a controllable process regime with the associated advantages, for example the abatement of any gases harmful to health that occur.

The aprotic solvent may be selected from the group consisting of dimethyl carbonate, acetonitrile, cyclohexane, toluene, p-xylene, anisole, pyridine, propylene carbonate, tetrahydrofuran, naphthalene and ethyl methyl carbonate, and mixtures thereof. An aprotic solvent is understood here to mean compounds that do not release or accept protons in the presence of lithium. The compounds in question thus have no chemical reactivity with respect to lithium.

In general, suitable aprotic solvents for the method of the invention are all of those known from the art that are chemically inert with respect to lithium.

The aprotic solvent serves to take up the solid electrolyte and leach it out of the solid blend. Thereafter, the solution of the solid electrolyte in the aprotic solvent can be separated from the insoluble constituents in a simple manner. The inventors have found that solid electrolytes in particular that have $PS_4^{3-}$ tetrahedral units as structural component show particularly good solubility in aprotic solvents. When aprotic solvents are used for dissolution and removal of the solid electrolyte, there is also no deterioration in physical properties with regard to the later performance of recycled solid electrolyte in recycled solid-state lithium batteries, for example a reduction in lithium ion conductivity.

The admixing of the solid blend with the aprotic solvent results in a heterogeneous mixture consisting of the solid electrolyte dissolved in the aprotic solvent as liquid component, and the undissolved solids including cathode material and lithium anode. The solids content in the heterogeneous mixture is preferably not more than 70% by weight, more preferably 30% to 70% by weight, further preferably 40% to 70% by weight or 50% to 70% by weight, based on the total weight of the mixture. Heterogeneous mixtures having a solids content of more than 70% by weight are not free-flowing and can therefore be separated only with difficulty. Preference is given to using only the amount of aprotic solvent necessary to bring the solid electrolyte into solution. The admixing of the solid blend with the aprotic solvent includes the use of known extraction methods and filtration methods.

After the removal of the solution of the solid electrolyte, the solid electrolyte dissolved in the aprotic solvent can be isolated and processed, for example, by recrystallization with a further solvent. Preferred solvents include tetrahydrofuran, toluene, dimethyl carbonate, acetonitrile, p-xylene, anisole, pyridine, propylene carbonate, naphthalene and ethyl methyl carbonate, and mixtures thereof.

The solid electrolyte may also be obtained by simply drying the solvent. The drying can be effected at room temperature. The drying can likewise be accelerated by heating. In particular, the drying can be effected under the influence of a reduced pressure or under an inert gas atmosphere, for example under nitrogen or argon. Drying by means of a reduced pressure or under inert gas atmosphere can also be conducted in combination with heating of the moist solid electrolyte.

The recycled solid electrolyte can be sent to further process steps. In addition, the solid electrolyte can be mechanically comminuted, for example by ball milling of the solid electrolyte. In particular, the recycled solid electrolyte can be subjected to heat treatment at a predetermined temperature for a predetermined period. The heat treatment serves to improve the crystallinity of the solid electrolyte and to eliminate crystal defects, and can be effected, for example, by heating under reduced pressure to a temperature of 350 to 600° C., preferably to 550° C. However, the temperature used for the heat treatment is not limited to the temperature range specified, but is guided by the respective solid electrolyte, especially by the crystallization temperature of the respective solid electrolyte at which the desired crystalline phase of the solid electrolyte can be obtained. The duration of heat treatment is likewise not fixed, but is effective until the desired phase and composition of the solid electrolyte is obtained. For example, the heat treatment time may be 1 minute to 48 h. The heat treatment of the solid electrolyte can be conducted under an air atmosphere, under an inert gas atmosphere, or under reduced pressure.

After the solution of the solid electrolyte in the aprotic solvent has been removed, the remaining insoluble constituents, especially from the lithium anode and the cathode material, are contacted with a protic solvent, preferably water. This forms a mixture of a solution of lithium salts LiX in the protic solvent and undissolved cathode material. The protic solvent has hydrogen atoms that are active with respect to lithium. The lithium metal from the lithium anode therefore reacts with the protic solvent to give hydrogen and lithium salts of the general formula LiX in which X denotes an alkoxide or a hydroxide ion, and where the lithium salts LiX are dissolved in the protic solvent.

In one embodiment of the invention, the hydrogen formed in the reaction of lithium metal with the protic solvent is collected. Hydrogen is a valuable resource with a high energy content and is therefore potentially utilizable for energy.

The reaction of metallic lithium with protic solvents to form hydrogen and lithium salts LiX proceeds exothermically. Various measures can be taken for control of this exothermic conversion of lithium to its salts in a controlled chemical reaction. Firstly, the kinetics of the exothermic reaction can be controlled via the specific selection and mixture of the protic solvent. Secondly, control of the exothermic reaction is also possible by the process regime.

For the control of the reaction via the selection of the protic solvent, the protic solvent may be selected from the group consisting of water and alkanols, and mixtures thereof.

Alkanols are understood to mean a group of substances with at least one functional hydroxyl group and an aliphatic alkyl radical. The aliphatic alkyl radical may be either branched, linear or cyclic. The alkanol of the invention may be a primary, secondary or tertiary alcohol.

Examples of primary alkanols include methanol, ethanol, propanol, butan-1-ol, pentan-1-ol, hexan-1-ol, heptan-1-ol, octan-1-ol, decan-1-ol, dodecan-1-ol, tetradecan-1-ol, hexadecan-1-ol, octadecan-1-ol.

Examples of secondary alkanols include propan-2-ol, butan-2-ol, pentan-2-ol, pentan-3-ol, 3-methylbutan-2-ol.

Examples of higher polyhydric alkanols include propane-1,2,3-triol, ethane-1,2-diol, propane-1,2-diol, propane-1,3-diol, butane-1,2-diol, butane-1,3-diol, butane-1,4-diol, butane-2,3-diol, pentane-1,5-diol, hexane-1,6-diol, octane-1,8-diol, nonane-1,9-diol, decane-1,10-diol.

Preferred alkanols are methanol, ethanol and propanol, and combinations thereof.

The kinetics of the chemical reaction can be controlled via the length of the aliphatic alkyl radical. Alkanols having longer-chain alkyl radicals react more slowly with the lithium anode to give lithium alkoxides and hydrogen than alkanols having shorter alkyl radicals. The process can be controlled in accordance with the selection of particular alkanols.

In particular, in one embodiment, water can be mixed with at least one alkanol. The resultant mixture of water with at least one alkanol can be combined with the insoluble constituents including lithium anode and cathode material. The kinetics of the reaction can be influenced via the mixing ratio of water to alkanol. The reactivity of the mixture rises with higher water content. Water is preferably present in the water-alkanol mixture in a proportion of at least 80% by weight or 85% by weight, more preferably at least 90% by weight, based on the total weight of the mixture.

The reaction kinetics can be influenced not only by the mixing ratio of water to alkanol but also by the chain length of the alkanol added to the mixture with water. A longer-chain alkanol in the mixture slows the reaction with the lithium anode, whereas a shorter-chain alkanol can be converted more quickly. Examples of preferred water-alkanol mixtures for lowering the reaction rate include combinations of water with at least one of methanol, ethanol and propanol, and combinations thereof, where the water is present preferably in a proportion of at least 80% by weight or 85% by weight, more preferably at least 90% by weight, based on the total weight of the mixture.

The reaction of lithium anode and protic solvents can also be controlled via the process regime. On combination of the insoluble constituents with the protic solvent, the solvent may be in the liquid phase and may optionally be cooled. In another embodiment of the invention, the protic solvent may be converted to the gas phase and be contacted in the gaseous state with the insoluble constituents including the lithium anode. In this embodiment, the proportion of protic solvents in the reaction mixture can be increased stepwise. Gradually increasing the protic solvent in the atmosphere enables a particularly controlled reaction with the insoluble constituents. It is also possible to conduct a combination of liquid and gas phase contact. The protic solvent may be an alkanol, water or water-alkanol mixture. The protic solvent used in the gas phase is preferably water.

In this embodiment, the chemical kinetics of the reaction are lowered by the process regime, and the lithium reacts with the protic solvent present in the gas phase in a delayed manner to give the corresponding lithium salts and hydrogen. In particular, the addition of the protic solvent in the gaseous state can be easily dosed and added in a controlled manner through controlled selection of pressure and temperature. This permits the introduction of further reaction parameters that enable control of the reaction, for example via temperature, pressure and concentration of the reactants.

After the protic solvent has been contacted with the insoluble constituents composed of lithium anode and cathode material, there is a solution of lithium salts LiX in the protic solvent. The solution of LiX can be separated from the undissolved cathode material by centrifugation, filtration or sedimentation.

The solution of lithium salts LiX can be isolated and collected. In particular, the solution of the lithium salts LiX can be concentrated or stored intermediately in solid form. The lithium salt LiX can also be converted to another compound that can be utilized in further process steps as an easily obtainable Li source for relithiation. By contrast with the prior art, the lithium from the lithium anode can thus be utilized wholly or partly for the relithiation of the cathode material, either directly in the form of the lithium salts LiX obtained from the contacting step or of the solution thereof in the protic solvent, or indirectly after conversion to another lithium compound such as lithium carbonate, which can be stored more easily.

A further advantage of the method of the invention is the recovery of excess lithium in the form of LiX with reference to the amount required for the relithiation of the cathode material. The method correspondingly enables the creation of a means of storing lithium. The LiX collected can thus also be utilized for subsequent methods and be added to the method according to the Li demand. The method of the invention is thus particularly resource-conserving and sustainable since no external Li sources are required for relithiation or the new production of cathode material.

The cathode material separated from the solution of LiX is subsequently calcined, for example by heating to a temperature of 600° C. to 1000° C., more preferably by heating to a temperature of 700° C. to 900° C. In one embodiment, it is possible to add a lithium compound even on calcining of the cathode material for relithiation. The lithium compound is preferably a lithium salt of the general formula LiX. More preferably, it is possible to use a solution of lithium salts LiX obtainable from step e) of the above-described method. The lithium compound can be added stoichiometrically. In particular, prior to the addition, the concentration of lithium salts LiX can be determined in the solution of LiX, which enables stoichiometric addition of lithium salts LiX to the cathode material during the recycling process. The stoichiometric addition permits inexpensive and resource-conserving handling of valuable raw material lithium.

In addition, it remains possible to convert the lithium salts LiX wholly or partly to a lithium compound such as lithium carbonate that can be dosed and stored more easily, and to use this lithium compound in the calcination step or a downstream process step for relithiation of the cathode material.

The cathode material can be calcined in a tunnel furnace or a rotary furnace. In particular, a low energy content is found for the calcination step, since the cathode material is already in the crystalline state. The low energy content results in a shorter calcination time or a low temperature.

The method of the invention is suitable for production of a recycled cathode material and solid electrolyte. The recycling of cathode material and solid electrolyte using the method of the invention is thus an important aspect for sustainability of the new concept of solid-state lithium batteries.

The recycled cathode material obtainable from the method of the invention and the solid electrolyte are suitable as a constituent for use in an electrochemical cell. In particular, the recycled cathode material and the solid electrolyte are suitable for use in a solid-state lithium battery, preferably for use in at least partly electrically driven vehicles. The solid-state lithium batteries of the invention have thus been manufactured from recycled materials and, by comparison with newly synthesized batteries, are produced in an environmentally responsible and sustainable manner.

Further advantages and features of the invention will be apparent from the description of a preferred embodiment that follows, in conjunction with the drawing to which reference is made.

BRIEF DESCRIPTION OF THE DRAWINGS

FIG. 1 shows a schematic flow diagram of the steps of a method of the invention for recycling a cathode material and solid electrolyte from solid-state lithium ion batteries.

DETAILED DESCRIPTION OF THE DRAWINGS

In FIG. 1, a solid-state lithium battery is separated into a solid blend, where the blend comprises the lithium anode, cathode material and solid electrolyte components (step S1).

The solid blend is admixed with an aprotic solvent, which forms a mixture of a solution of the solid electrolyte in the aprotic solvent and insoluble constituents including lithium anode and cathode material (step S2).

In the next step, the solution of the solid electrolyte is separated from the insoluble constituents (step S3), for example by suitable filtration or extraction techniques.

Finally, the solid electrolyte dissolved in the aprotic solvent is isolated from the aprotic solvent and processed, preferably by heat treatment, more preferably by recrystallization with a further solvent (step S4). The solid electrolyte thus recovered is available for use for new production of solid-state lithium ion batteries. Examples of suitable solvents for recrystallization include tetrahydrofuran, toluene and cyclohexane, and mixtures thereof.

Then the insoluble constituents are contacted with a protic solvent, forming a mixture of a solution of lithium salts of the general formula LiX in the protic solvent and undissolved cathode material, where the lithium anode reacts with the protic solvent to give hydrogen and lithium salts LiX, and where the lithium salts LiX are dissolved in the protic solvent (step S5). In the lithium salts LiX, X denotes an alkoxide or a hydroxide ion.

The hydrogen formed on contacting of the protic solvent with the insoluble constituents from lithium anode and cathode material can simultaneously be collected and stored (step S6).

Thereafter, the solution of LiX is separated from the undissolved cathode material (step S7).

Finally, the solution of lithium salts LiX can be isolated and collected, or the lithium salts LiX can be converted to another lithium compound (step S8).

Finally, the cathode material separated off is calcined with addition of a lithium compound. The lithium compound is preferably a lithium salt LiX obtained from step S8, further preferably a solution of lithium salts LiX in the protic solvent, or a lithium compound obtained from the lithium salts LiX, such as lithium carbonate (step S9).

The invention claimed is:

1. A method for recycling a cathode material and a solid electrolyte from a solid-state lithium battery, the method comprising the steps of:
   a) separating the solid-state lithium battery into a solid mixture, wherein the mixture comprises lithium anode, cathode material and solid electrolyte components;
   b) mixing the solid mixture with an aprotic solvent to form a solution of the solid electrolyte in the aprotic solvent and insoluble constituents comprising lithium anode and cathode material;
   c) separating the solution of the solid electrolyte from the insoluble constituents;
   d) contacting the insoluble constituents with a protic solvent to form a solution of lithium salts of the general formula LiX in the protic solvent and undissolved cathode material, wherein X is an alkoxide or a hydroxide ion, the lithium anode reacts with the protic solvent to form hydrogen and lithium salts LiX, and the lithium salts LiX dissolves in the protic solvent;
   e) separating the solution of lithium salts LiX from the undissolved cathode material; and
   f) calcining the separated cathode material with the addition of a lithium compound.

2. The method according to claim 1, wherein the cathode material is selected from the group consisting of lithium cobalt oxide, lithium nickel oxide, lithium nickel cobalt aluminum oxide, lithium nickel manganese cobalt oxide, lithium manganese oxide, lithium iron phosphate, lithium nickel manganese oxide, lithium nickel manganese oxide spinel, and combinations thereof.

3. The method according to claim 1, wherein
the solid electrolyte comprises a sulfide-based solid electrolyte.

4. The method according to claim 3, wherein
the sulfide-based solid electrolyte is a lithium phosphorus sulfide and/or a lithium boron sulfide of the general formula $Li_xT_yS_zR_q$ in which T is boron or phosphorus, and R is a halogen, and where $2 \leq x \leq 7$, $1 \leq y \leq 7$, $3 \leq z \leq 13$, $0 \leq q \leq 1$.

5. The method according to claim 1, wherein
the lithium anode comprises a lithium metal or a lithium alloy.

6. The method according to claim 5, wherein
the lithium alloy is selected from manganese, zinc, silver, lithium, silicon, germanium and antimony, and combinations thereof.

7. The method according to claim 1, wherein
the separating of the solid-state lithium battery is conducted in a closed system.

8. The method according to claim 7, wherein
the separating of the solid-state lithium battery is conducted under a protective gas atmosphere.

9. The method according to claim 1, wherein
the aprotic solvent is selected from the group consisting of dimethyl carbonate, acetonitrile, cyclohexane, toluene, p-xylene, anisole, pyridine, propylene carbonate, tetrahydrofuran, naphthalene and ethyl methyl carbonate, and mixtures thereof.

10. The method according to claim 1, wherein
the mixing of the solid mixture with the aprotic solvent results in a heterogeneous mixture consisting of the liquid aprotic solvent component and the solids comprising cathode material and lithium anode, wherein the solids content in the heterogeneous mixture is not more than 70% by weight, based on the total weight of the mixture.

11. The method according to claim 1, wherein
the separating of the solution of the solid electrolyte is followed by isolating and processing of the solid electrolyte dissolved in the aprotic solvent.

12. The method according to claim 11, wherein
the isolating and processing of the solid electrolyte dissolved in the aprotic solvent is done with heat treatment.

13. The method according to claim 11, wherein
the isolating and processing of the solid electrolyte dissolved in the aprotic solvent is carried out by recrystallization with a further solvent selected from the group consisting of tetrahydrofuran, toluene, dimethyl carbonate, acetonitrile, p-xylene, anisole, pyridine, propylene carbonate, naphthalene and ethyl methyl carbonate and cyclohexane, and mixtures thereof.

14. The method according to claim 1, wherein
the protic solvent is selected from the group consisting of water and alkanols, and mixtures thereof, wherein the contacting of the protic solvent with the insoluble constituents comprises an addition of the protic solvent in the liquid phase and/or gas phase.

15. The method according to claim 1, wherein
a lithium compound is added in the calcining of the cathode material in step f).

16. The method according to claim 15, wherein
the lithium compound is selected from the lithium salts LiX obtained from step e), a solution of the lithium salts LiX in the protic solvent or a lithium compound obtained from lithium salts, and combinations thereof.

\* \* \* \* \*